United States Patent
Sugino et al.

(10) Patent No.: US 7,977,907 B2
(45) Date of Patent: Jul. 12, 2011

(54) DRIVING SYSTEM FOR MOBILE ROBOT

(75) Inventors: Tsukasa Sugino, Wako (JP); Masakazu Kawai, Wako (JP); Kenro Udono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 438 days.

(21) Appl. No.: 12/213,238

(22) Filed: Jun. 17, 2008

(65) Prior Publication Data

US 2008/0309277 A1 Dec. 18, 2008

(30) Foreign Application Priority Data

Jun. 18, 2007 (JP) .................................. 2007-160037

(51) Int. Cl.
 *B25J 9/16* (2006.01)
(52) U.S. Cl. .................................. 318/568.1; 318/568.11
(58) Field of Classification Search .................. 318/567, 318/568.1, 568.11, 568.12, 568.16
See application file for complete search history.

(56) References Cited

U.S. PATENT DOCUMENTS

| | | | | | |
|---|---|---|---|---|---|
| 5,151,859 | A | * | 9/1992 | Yoshino et al. | 701/23 |
| 5,610,488 | A | * | 3/1997 | Miyazawa | 318/568.11 |
| 6,377,013 | B2 | * | 4/2002 | Suzuki | 318/568.1 |
| 6,538,410 | B2 | * | 3/2003 | Mori et al. | 318/568.12 |
| 6,564,888 | B1 | * | 5/2003 | Gomi et al. | 180/8.6 |
| 6,573,636 | B1 | * | 6/2003 | Iino et al. | 310/316.01 |
| 6,640,160 | B2 | * | 10/2003 | Takahashi et al. | 700/245 |
| 2004/0238240 | A1 | * | 12/2004 | Hirose et al. | 180/8.1 |
| 2006/0249314 | A1 | * | 11/2006 | Takenaka et al. | 180/8.1 |
| 2007/0046237 | A1 | * | 3/2007 | Lakshmanan et al. | 318/568.11 |

FOREIGN PATENT DOCUMENTS

JP 11-048170 2/1999

* cited by examiner

*Primary Examiner* — Rina I Duda
(74) *Attorney, Agent, or Firm* — Squire, Sanders & Dempsey (US) LLP

(57) ABSTRACT

In a system for driving a mobile robot having a body, a plurality of legs each comprising a thigh link and a shank link, a first electric motor and a second motor for driving the thigh link in a forwarding direction, a power line connecting a power source to the first and the second motors, and a motor driver that supplies drive voltage to the first and second motors, a booster that boosts the drive voltage to be supplied to the first and second motors is provided such that the booster and the motor driver are installed in the thigh link where the first and second motors are installed, thereby enabling to satisfy both the low-voltage demand and high-voltage demand and to supply drive voltage to the motors effectively.

9 Claims, 14 Drawing Sheets

| MOTION MODE | DRIVE VOLTAGE [V] | CURRENT F/B GAIN |
|---|---|---|
| OTHER THAN WALKING | Vm | Kip: 4a<br>Kii: 4b |
| LOW SPEED WALKING | 2Vm | Kip: 2a<br>Kii: 2b |
| HIGH SPEED WALKING | 4Vm | Kip: a<br>Kii: b |

| MOTION MODE | DRIVE VOLTAGE [V] | CURRENT F/B GAIN |
|---|---|---|
| OTHER THAN WALKING | Vm | Kip: 4a<br>Kii: 4b |
| LOW SPEED WALKING OR SUPPORTING-LEG PERIOD OF HIGH SPEED WALKING | 2Vm | Kip: 2a<br>Kii: 2b |
| FREE-LEG PERIOD OF HIGH SPEED WALKING | 4Vm | Kip: a<br>Kii: b |

| REQUIRED JOINT ANGULAR VELOCITY [rad/s] | DRIVE VOLTAGE [V] | CURRENT F/B GAIN |
|---|---|---|
| $\omega 1$ | Vm | Kip: 4a<br>Kii: 4b |
| $\omega 2$ | 2Vm | Kip: 2a<br>Kii: 2b |
| $\omega 3$ | 3Vm | Kip: 1.5a<br>Kii: 1.5b |
| $\omega 4$ | 4Vm | Kip: a<br>Kii: b |

DRIVING SYSTEM FOR MOBILE ROBOT

BACKGROUND OF THE INVENTION

1. Field of the Invention

This invention relates to a driving system for a mobile robot, particularly to a driving system for a mobile robot that can effectively supply drive voltage to electric motors installed at joints of the robot.

2. Description of the Related Art

Generally, a mobile robot moves when drive voltage is supplied to electric motors from an on-board battery (power source). One example thereof is a technique taught by Japanese Laid-Open Patent Application No. Hei 11 (1999)-48170. The reference discloses a driving system for a legged mobile robot having two leg links connected to a body through hip joints and each connected by a knee joint, electric motors installed at the joints, a battery (power source) installed in the body and driving circuits that supplies voltage from the battery through power lines to the motors to drive them. When the remaining capacity of the battery is small, the system discriminates that the robot is likely to fall down and controls the robot operation to lower its center of gravity. In the aforesaid prior art, the power lines connecting the battery to some motors are arranged across the associated joints.

Considering the possibility of, for instance, electric leakage due to breakage of the power line in the joint, it is preferable to drive the motors at low voltage. On the other hand, it is necessary to drive the motors at high voltage to increase their rotational speed for controlling the robot to move at a high speed. Thus, the above two demands are contradictory.

SUMMARY OF THE INVENTION

An object of this invention is therefore to overcome the drawback of the aforesaid prior art by providing a driving system for a mobile robot that satisfies both the low-voltage demand for safety and the high-voltage demand for high-speed movement, thereby enabling to supply drive voltage to the electric motors effectively.

In order to achieve the object, this invention provides in a first aspect a system for driving a mobile robot having at least a plurality of links each connected by a joint, an electric motor installed at the joint, a power source installed at a position other than the links, a power line connecting the power source to the motor, and a motor driver that supplies drive voltage supplied through the power line from the power source to the motor to drive the motor, comprising: a booster that boosts the drive voltage to be supplied to the motor, the booster and the motor driver being installed at one of the links where the motor is installed.

In order to achieve the object, this invention provides in a second aspect a system for driving a mobile robot having at least a body, a plurality of legs each comprising a thigh link connected to the body by a hip joint and a shank link connected to the thigh link by a knee joint, a first electric motor for driving the thigh link in a forwarding direction in which the robot forwards, a second electric motor for driving the shank link in the forwarding direction, a power source installed at a position other than the thigh link and shank link, a power line connecting the power source to the first motor and the second motor, a motor driver that supplies drive voltage supplied through the power line from the power source to the first motor and the second motor to drive the motors, comprising: a booster that boosts the drive voltage to be supplied to the first motor and the second motor, the booster and the motor driver being installed in the thigh link where the first motor and the second motor are installed.

BRIEF DESCRIPTION OF THE DRAWINGS

The above and other objects and advantages of the invention will be more apparent from the following description and drawings in which:

FIG. 6 is a block diagram showing feedback loop of control of the motors shown in FIG. 4 and the like;

DETAILED DESCRIPTION OF THE PREFERRED EMBODIMENTS

A driving system for a mobile robot according to embodiments of the present invention will now be explained with reference to the attached drawings.

Figure 1:
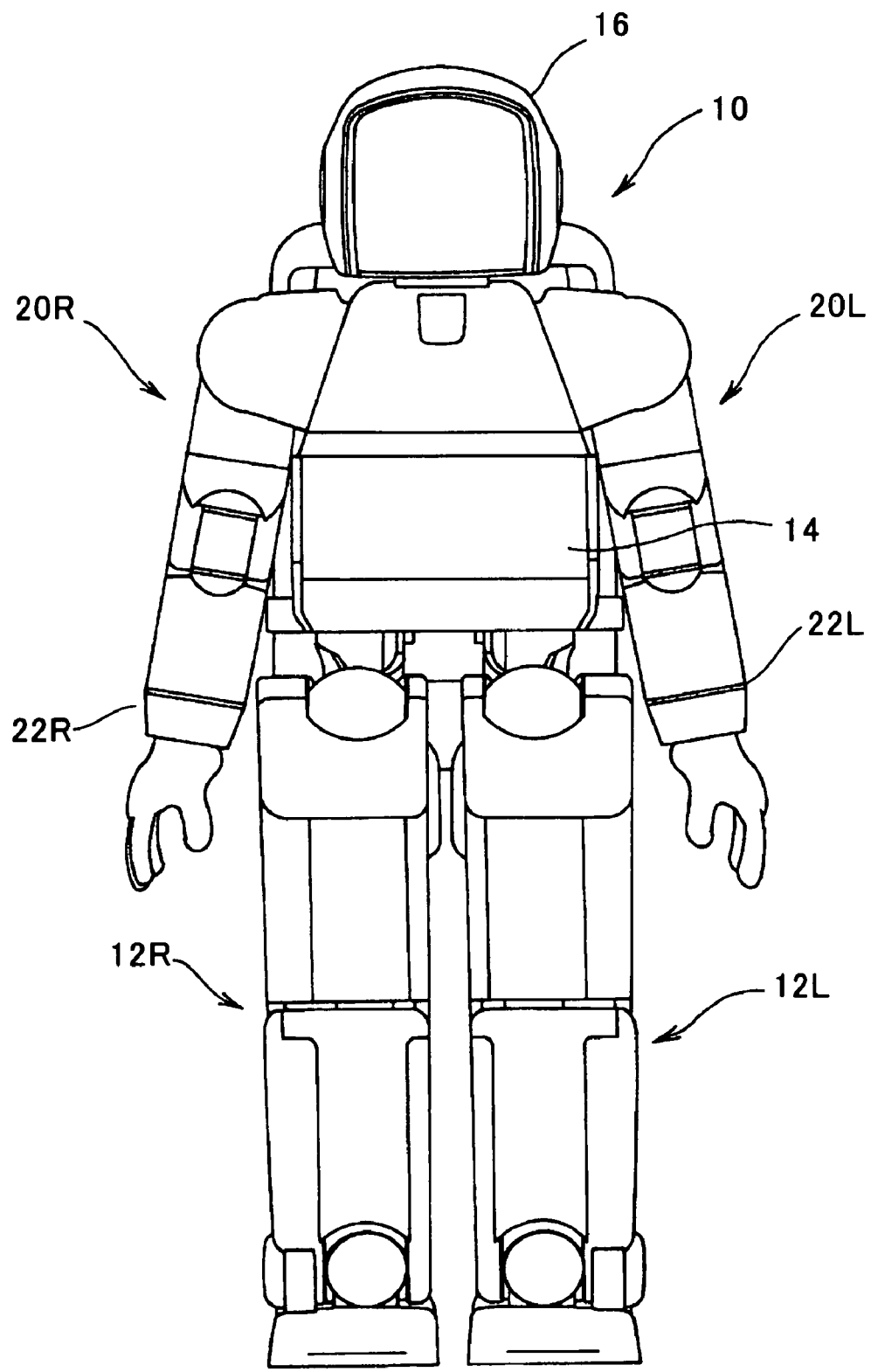
FIG. 1 is a front view of a robot to which a driving system for a mobile robot according to a first embodiment of this invention is applied.
Figure 2:
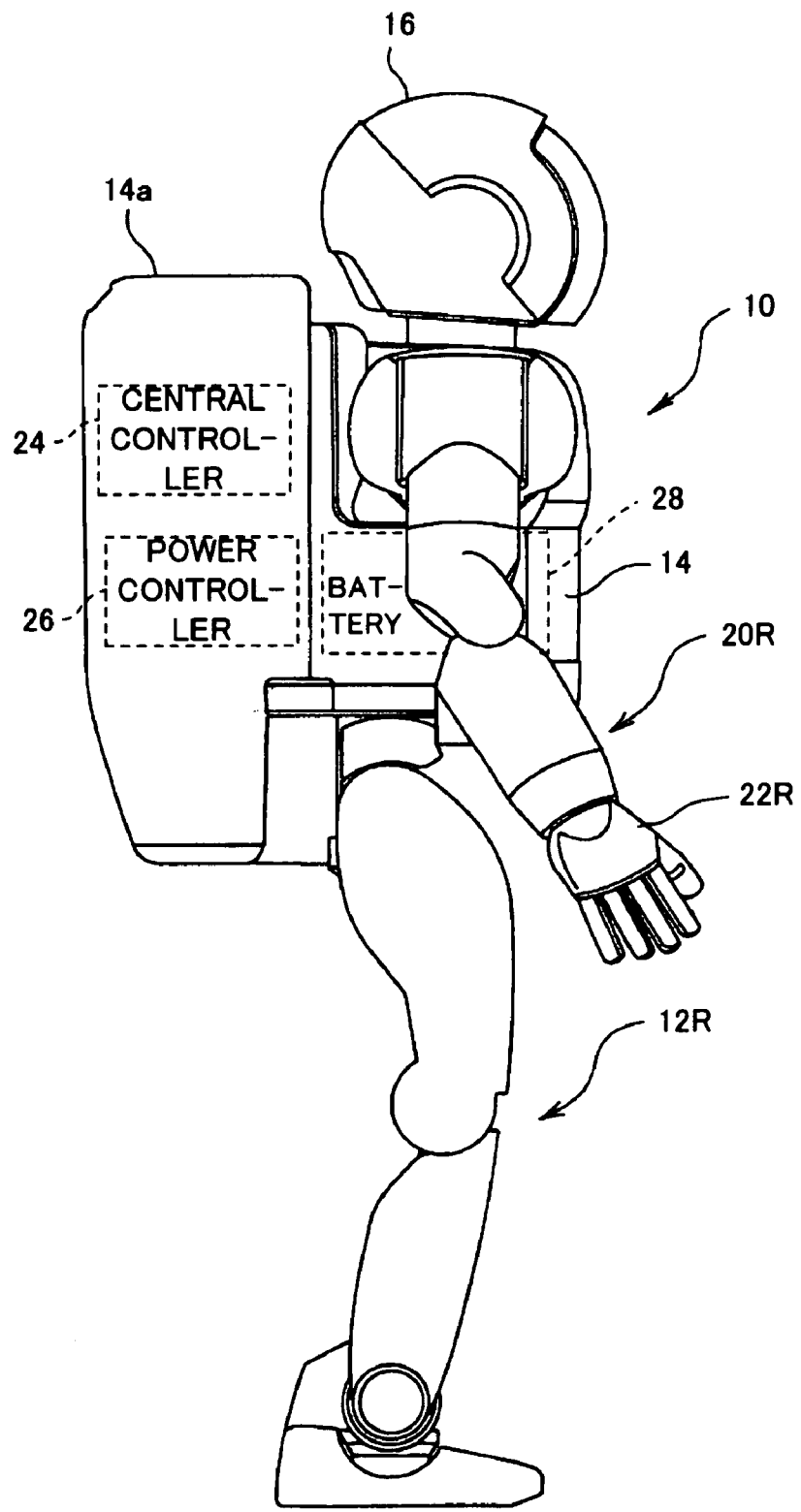
FIG. 2 is a side view of the robot shown in FIG. 1.

FIG. 1 is a front view of a robot to which a driving system for a mobile robot according to a first embodiment of this invention is applied and FIG. 2 is a side view of the robot shown in FIG. 1. A legged mobile robot with two legs is taken as an example of the mobile robot.

As shown in FIG. 1, the legged mobile robot (hereinafter called simply "robot") 10 has a plurality of, i.e., two legs (links), namely with a left leg 12L and a right leg 12R (the symbols L and R are used to indicate the left and right sides; hereinafter the same). The legs 12L, 12R are connected to the bottom of a main body (trunk) 14. A head 16 is connected to the top of the body 14 and a plurality of, i.e., two arms, namely a left arm 20L and a right arm 20R, are connected to the sides of the body 14. Hands or end effectors 22L, 22R are connected to the distal ends of the left and right arms 20L, 20R.

As shown in FIG. 2, a housing unit 14a is mounted on the back of the body 14. The housing unit 14a accommodates therein a central controller 24 and a power controller 26 and the body 14 accommodates therein a battery (power source) 28 and the other components.

Figure 3:
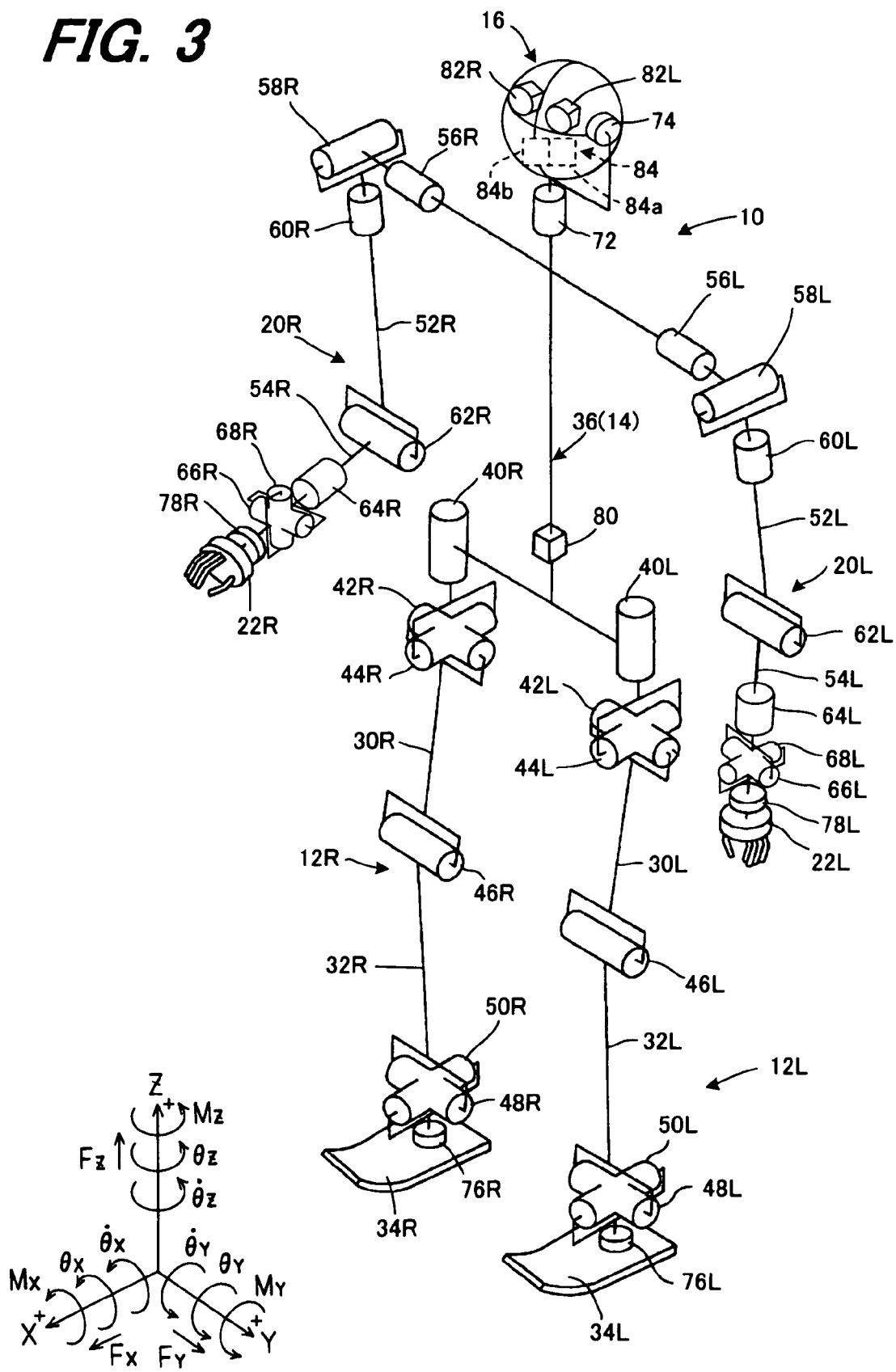
FIG. 3 is an explanatory diagram showing a skeletonized view of the robot shown in FIG. 1.

FIG. 3 is an explanatory diagram showing a skeletonized view of the robot 10 shown in FIG. 1. The internal structure of the robot 10 will be explained with reference to this drawing, with primary focus on the joints. Since the illustrated robot 10 is laterally symmetrical, affixation of L and R will be omitted in the following explanation.

The left and right legs 12 are each equipped with a thigh link 30, a shank link 32, and a foot 34. The thigh link 30 is connected to the body 14 through a hip joint. The body 14 is illustrated schematically as a main body link 36 in FIG. 3. Actuators are installed at the hip joint, which has three degrees of freedom, comprising an electric motor (1Z motor) 40 having a rotary shaft rotatable about a Z-axis (yaw axis), an electric motor (1Y motor) 42 having a rotary shaft rotatable about a Y-axis (pitch axis lying in the lateral direction of the robot 10), and an electric motor (1X motor) 44 having a rotary shaft rotatable about an X-axis (roll axis lying in the fore-aft direction of the robot 10).

A knee joint has an actuator comprising an electric motor (2Y motor) 46 having a rotary shaft rotatable about the Y-axis and has one degree of freedom. A foot joint has actuators comprising an electric motor (3Y motor) 48 having a rotary shaft rotatable about the Y-axis and an electric motor (3X motor) 50 having a rotary shaft rotatable about the X-axis and has two degrees of freedom. The thigh link 30 and shank link 32 are connected by the knee joint and the shank link 32 and foot 34 are connected by the ankle joint. The legs 12 have twelve rotary shafts individually driven by twelve electric motors installed at suitable locations on the body 14 and legs 12.

The left and right arms 20 are each equipped with an upper arm link 52 and a forearm link 54. The upper arm link 52 is connected to the body 14 through a shoulder joint. The upper arm link 52 and forearm link 54 are connected by an elbow joint, and the forearm link 54 and hand 22 are connected by a wrist joint.

The shoulder joint, which has three degrees of freedom, has actuators comprising an electric motor 56 having a rotary shaft rotatable about Y-axis, an electric motor 58 having a rotary shaft rotatable about the X-axis, and an electric motor 60 having a rotary shaft rotatable about the Z-axis. The elbow link has an actuator comprising an electric motor 62 having a rotary shaft rotatable about the Y-axis and has one degree of freedom. The wrist joint, which has three degrees of freedom, has actuators comprising an electric motor 64 having a rotary shaft rotatable about the Z-axis, an electric motor 66 having a rotary shaft rotatable about the Y-axis, and an electric motor 68 having a rotary shaft rotatable about the X-axis. Similarly to the legs 12, the arms 20 have fourteen rotary shafts individually driven by fourteen electric motors installed at suitable locations on the body 14 and arms 20.

The head 16 is connected to the body 14 through a neck joint that has an actuator comprising an electric motor 72 having a rotary shaft rotatable about the Z-axis and an electric motor 74 having a rotary shaft rotatable about the Y-axis and thus has two degrees of freedom. The head 16 also has two rotary shafts individually driven by the two electric motors.

A six-axis force sensor 76 attached to each leg 12 produces an output or signal representing the floor reaction force components Fx, Fy and Fz of three directions and the moment components Mx, My and Mz of three directions acting on the leg 12 from the floor. A similar six-axis force sensor 78 attached to each arm 20 between the hand 22 and the wrist joint produces an output or signal representing the external force components Fx, Fy and Fz of three directions and the moment components Mx, My and Mz of three directions acting on the arm 20.

The body 14 is installed with an inclinometer 80 composed of three acceleration sensors that produce outputs or signals indicative of acceleration in the directions of X, Y and Z axes and three vibrational gyroscopes that produce outputs or signals indicative of angular velocity about the X, Y and Z axes.

The head 16 is equipped with two CCD cameras 82 that take and produce outputs or signals indicative of stereographic images of the robot 10 surroundings and with an audio input-output device 84 comprising a microphone 84a and a speaker 84b.

Rotary encoders (not shown) installed at the individual motors 40, 42 etc. of the legs 12 and arms 20 produce outputs or signals representing the rotation angles, namely, the joint angles. The motors 40, 42 etc. each comprises a DC brushless motor, for example.

The outputs of the sensors and the like are sent to the central controller 24. The central controller 24, which is constituted as a CPU unit, controls the operation of the motors of the legs 12 such as the 1Z motor 40 to drive the legs 12 for making the robot 10 walk. It also controls the operation of the motor 56 or the other motors of the arms 20 to drive the arms 20, and controls the operation of the motor 72 or the other motors of the head 16 to regulate the orientation of the head 16.

Figure 4:
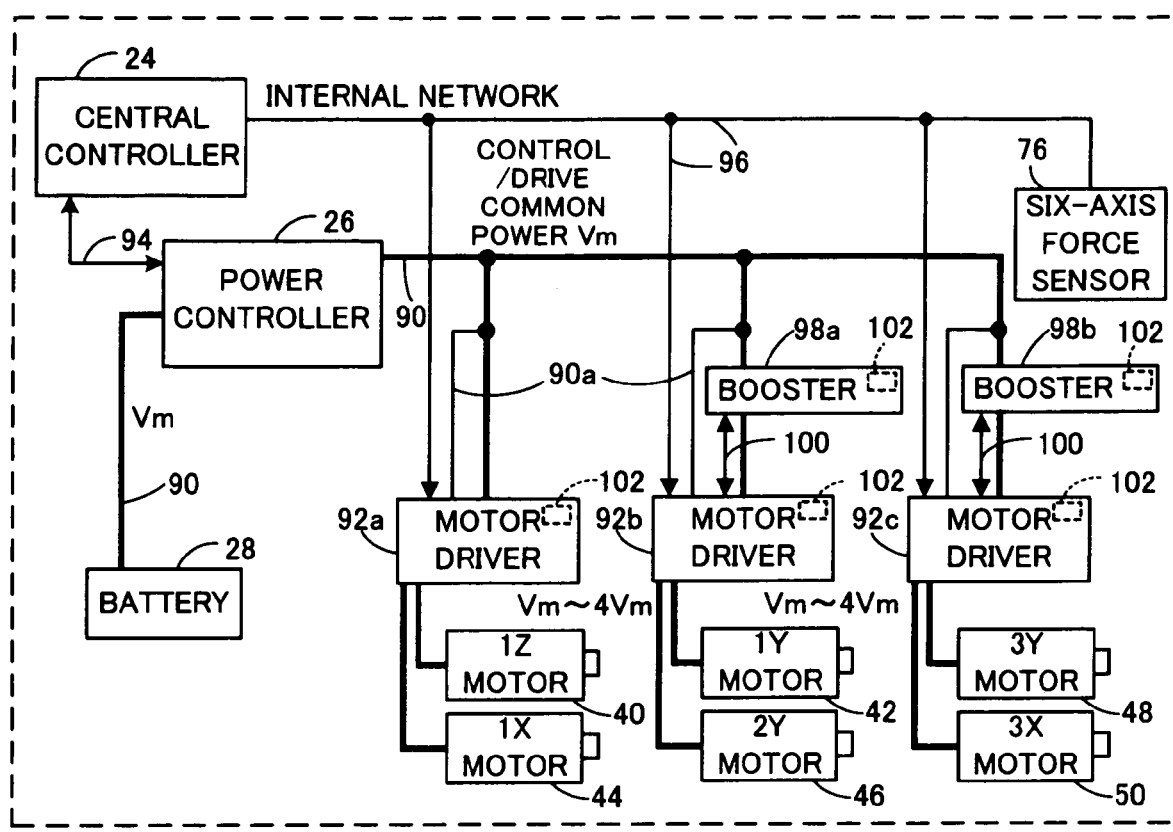
FIG. 4 is a block diagram showing supply of drive voltage from a battery shown in FIG. 2 to electric motors.

FIG. 4 is a block diagram showing supply of drive voltage from the battery 28 to the electric motors such as the 1Z motor 40. In the figure, the structure of one of the legs 12 is only shown and that of the other leg or the arms 20 is omitted.

As shown, the battery 28 is connected to the six motors including the 1Z motor 40 through power lines 90 via the power controller 26 and three motor drivers (driver circuits) 92, i.e., 92a, 92b and 92c. The central controller 24 is connected to the power controller 26 through a signal line 94 to communicate bi-directionally and connected to the three motor drivers 92 through signal lines 96 to communicate bi-directionally. The motor drivers 92 each comprises a CPU and controls operation of the two motors connected thereto.

Boosters (step-up transformers) 98, i.e., 98a and 98b are interposed in the power lines 90 connected to the motor drivers 92b, 92c out of three. The boosters 98a, 98b are connected to the motor drivers 92b, 92c, by signal lines 100 respectively to communicate bi-directionally.

The battery 28 outputs voltage Vm [V] of a predetermined level which is relatively low. The voltage Vm outputted from the battery 28 is sent via the power controller 26 to the power lines 90, and is supplied through the power lines 90 to the motor drivers 92 (and temperature sensors etc., explained later) as operating power and to the motors such as the 1Z motor 40 as driving power. More specifically, the power lines 90 include branch lines 90a, through which the control power is sent to the three motor drivers 92 and the like as operating power.

With the illustrated configuration, the voltage Vm of the predetermined level is directly supplied as the drive voltage to the 1Z motor 40 and 1X motor 44 via the motor driver 92a, while the voltage Vm or a voltage boosted by four times at maximum (4 Vm) by the boosters 98 is supplied as drive voltage to the 1Y motor 42, 2Y motor 46, 3Y motor 48 and 3X motor 50.

The signal lines 96 are constituted by the ARCNET (RS485-based communication) or the Ethernet ("registered trademark") and form an internal network. The output of the six-axis force sensor 76 is sent to the central controller 24 through the signal line 96. The temperature sensors 102 are installed in the three motor drivers 92 and two boosters 98, and produce outputs indicative of temperatures of the located position. The outputs of the temperature sensors 102 are also sent to the central controller 24 and motor drivers 92 through the signal lines 96. Although not shown in the drawing, the outputs of the rotary encoders installed at the 1Z motor and the like are similarly sent to the central controller 24 and motor drivers 92 through the signal lines 96.

As described in the foregoing, the central controller 24 controls the operation of the motors such as the 1Z motor of the legs 12 to drive the legs 12. In other words, based on a motion (walking) mode determined from gaits set in advance, the central controller 24 sends position/velocity/current (torque) control commands for each of the motors to the motor drivers 92, and the motor drivers 92 send to the central controller 24 values actually occurred in response to the sent command. In addition, information including temperature, malfunction, specific set values of the motor drivers 92 and the like are sent and received between the central controller 24 and motor drivers 92.

Similarly, power control commands, information of voltage/current and the like and other various information of temperature, malfunction, set values and the like are sent and received between the central controller 24 and power controller 26, so that the power control including power distribution to the head 16, arms 20 and legs 12 is conducted.

Figure 5:
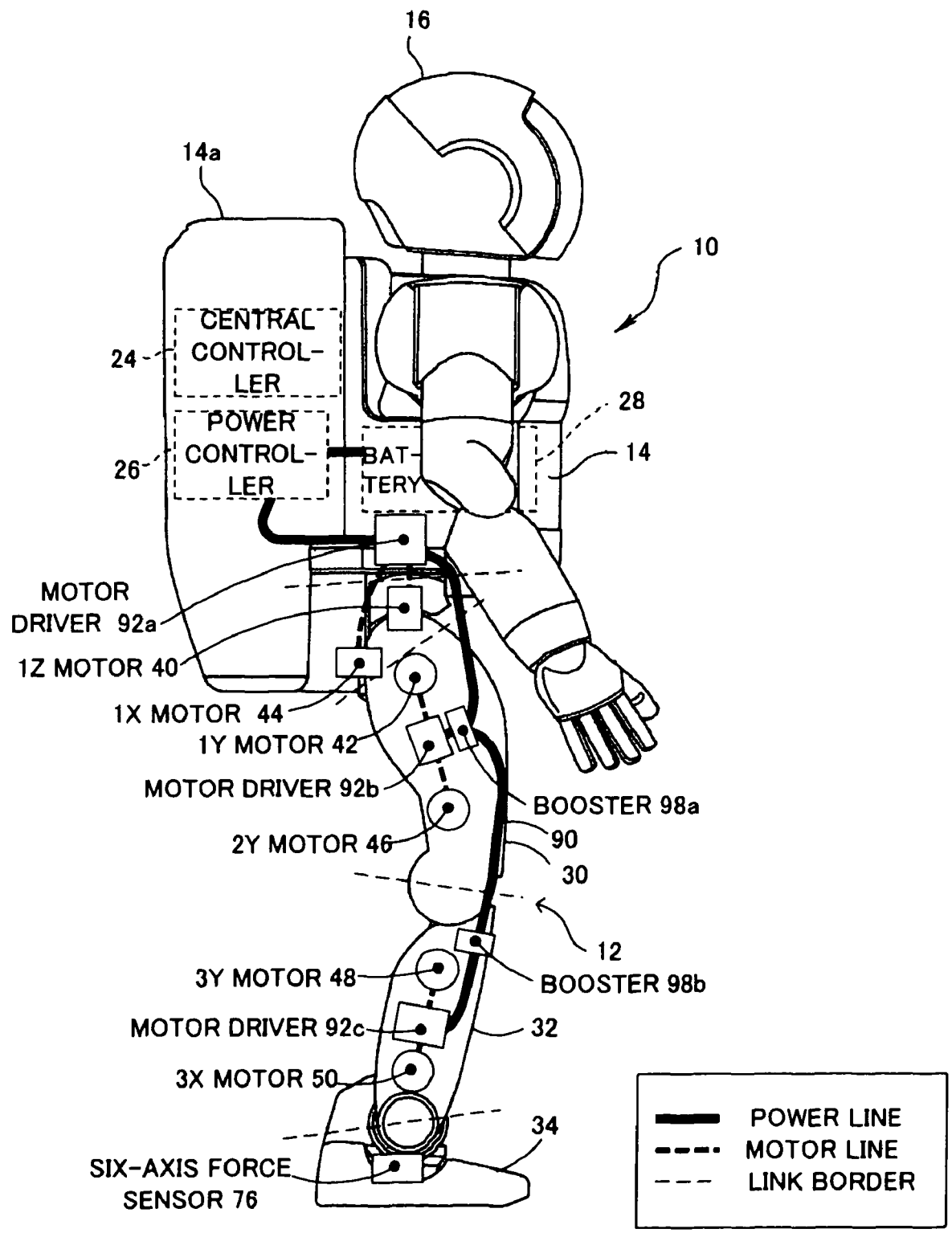
FIG. 5 is a side view of the robot similar to FIG. 2, but specifically showing the arrangement of motor drivers shown in FIG. 4 and the like in the robot.

FIG. 5 is a side view of the robot 10 similar to FIG. 2, but specifically showing the arrangement of the motor drivers 92 shown in FIG. 4 and the like in the robot 10.

Since, as shown, the central controller 24 and power controller 26 are accommodated in the housing unit 14a and the battery 28 is installed in the body 14, the power lines 90 and signal lines (internal network) 96 run throughout the thigh link 30 and shank link 32 across the hip joints or knee joints. Wiring of the power lines 90 in the joint regions is made loose taking motions of the joints into account.

The motor driver 92a is installed in the body 14, while the 1Z motor 40 and 1X motor 44 are installed at the thigh link 30, thus they are not installed at the same link. On the other hand, the motor driver 92b, 1Y motor 42, 2Y motor 46 and booster 98a are installed at the same link, i.e., the thigh link 30. Similarly, the motor driver 92c, 3Y motor 48, 3X motor 50 and booster 98b are installed at the same link, i.e., the shank link 32.

More specifically, the 1Y motor 42 for driving the thigh link 30 in the forwarding direction (in which the robot 10 forwards), the 2Y motor 46 for driving the shank link 32 in the forwarding direction, the motor driver 92b for the motors 42, 46 and the booster 98a are installed at the same link, i.e., the thigh link 30. The 3Y motor 48 for driving the foot 34 in the forwarding direction, the 3X motor 50 for driving the foot 24 in the lateral (right-and-left) direction perpendicular to the forwarding direction, the motor driver 92c for the motors 48, 50 and the booster 98b are installed at the same link, i.e., the shank link 32.

Here, an object of this invention will be again explained.

Figure 17:
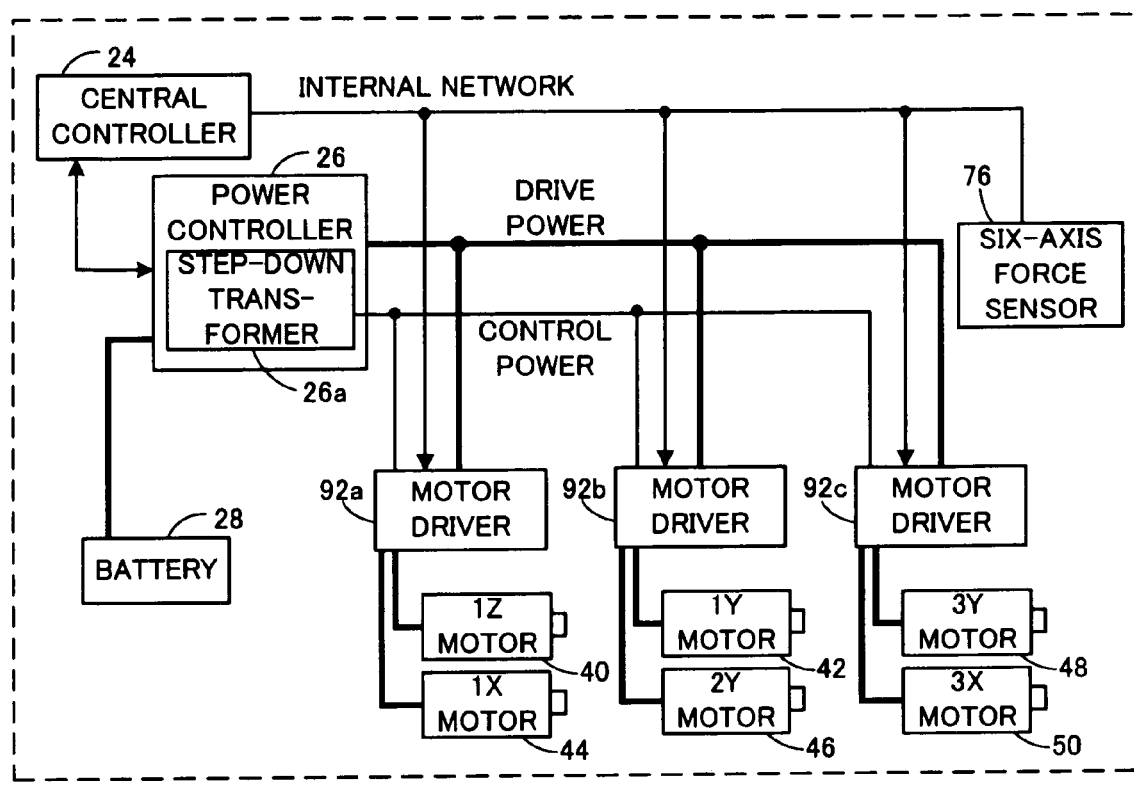
FIG. 17 is a block diagram similar to FIG. 4, but showing a driving system for a mobile robot according to a prior art.

FIG. 17 is a block diagram similar to FIG. 4, but showing supply of the drive voltage from the battery 28 to the motors such as the 1Z motor 40, which is employed in the prior art.

In the configuration shown in FIG. 17, since a high voltage (several times of the predetermined level Vm) is supplied from the battery 28 to the motors including the 1Z motor 40 through the power lines 90, if the power lines 90 should be broken due to robot's fall, the broken power lines 90 may be exposed in the joint regions. Taking safety into consideration, therefore, it is preferable to supply power to the motors at low voltage. In the case where the robot 10 stands upright or does not move at high speed, it is possible to control the operation of the robot 10 with power of relatively low voltage, e.g., twice of the predetermined level (2 Vm) or thereabout.

However, rotational speed of the motors must be increased for making the robot walk at high speed and in addition, higher voltage should be supplied from the viewpoint of the motor size or efficiency. Thus it is difficult to lower a power supply voltage of the robot 10. Specifically, in designing a robot, supply of low voltage with the priority of safety and that of high voltage with the main concern on the high speed walking are contradictory. It should be noted that the expression the "high speed walking" in this specification can include not only walking but running.

This problem can be overcome by the configuration shown in FIGS. 4 and 5, in which, in addition to the configuration shown in FIG. 17, the boosters 98a, 98b are interposed at a location upstream of the motor drivers 92b, 92c and the booster 98a, motor driver 92b and 1Y motor 42 and the like are installed at the same link such that the power lines 90 connecting them are arranged not to across a joint.

Nevertheless, since the 1Z motor 40 and 1X motor 44 do not require high rotational speed and the power lines 90 connecting the motors 40, 44 to the motor driver 92a are arranged across the hip joint, the motor driver 92a is not supplied with the booster 98.

During upright or low speed walking, the motor drivers 92b, 92c keep the boosters 98a, 98b off. On the other hand, during high speed walking, information on the high speed walking (motion) mode is sent from the central controller 24 to the motor drivers 92b, 92c through the signal lines (internal network) 96, so that the motor drivers 92b, 92c send drive voltage control signals to the boosters 98a, 98b through the signal lines 100 to turn them on.

As a result, the motor drivers 92b, 92c downstream of the boosters 98a, 98b, made on, are supplied with high voltage driving power. Accordingly, the motor drivers 92b, 92c change setting of current feedback gain to those corresponding to the walking mode received from the central controller 24 through the signal lines 96, and achieve a motor rotational speed as desired.

The high speed walking is a motion mode in which the robot 10 walks at a speed above 1.8 km/h and the low speed walking is a motion mode in which it walks at a speed below 1.8 km/h. In the low speed walking, the rotational speeds of the all motors are low even during a free-leg period, while in the high speed walking, the 1Y motor 42 and 2Y motor 46 must rotate faster particularly during the free-leg period. For that reason, as explained with respect to FIG. 5, at least the motors are installed with the boosters 98 and are positioned in the same link including the motor drivers 92.

Figure 6:
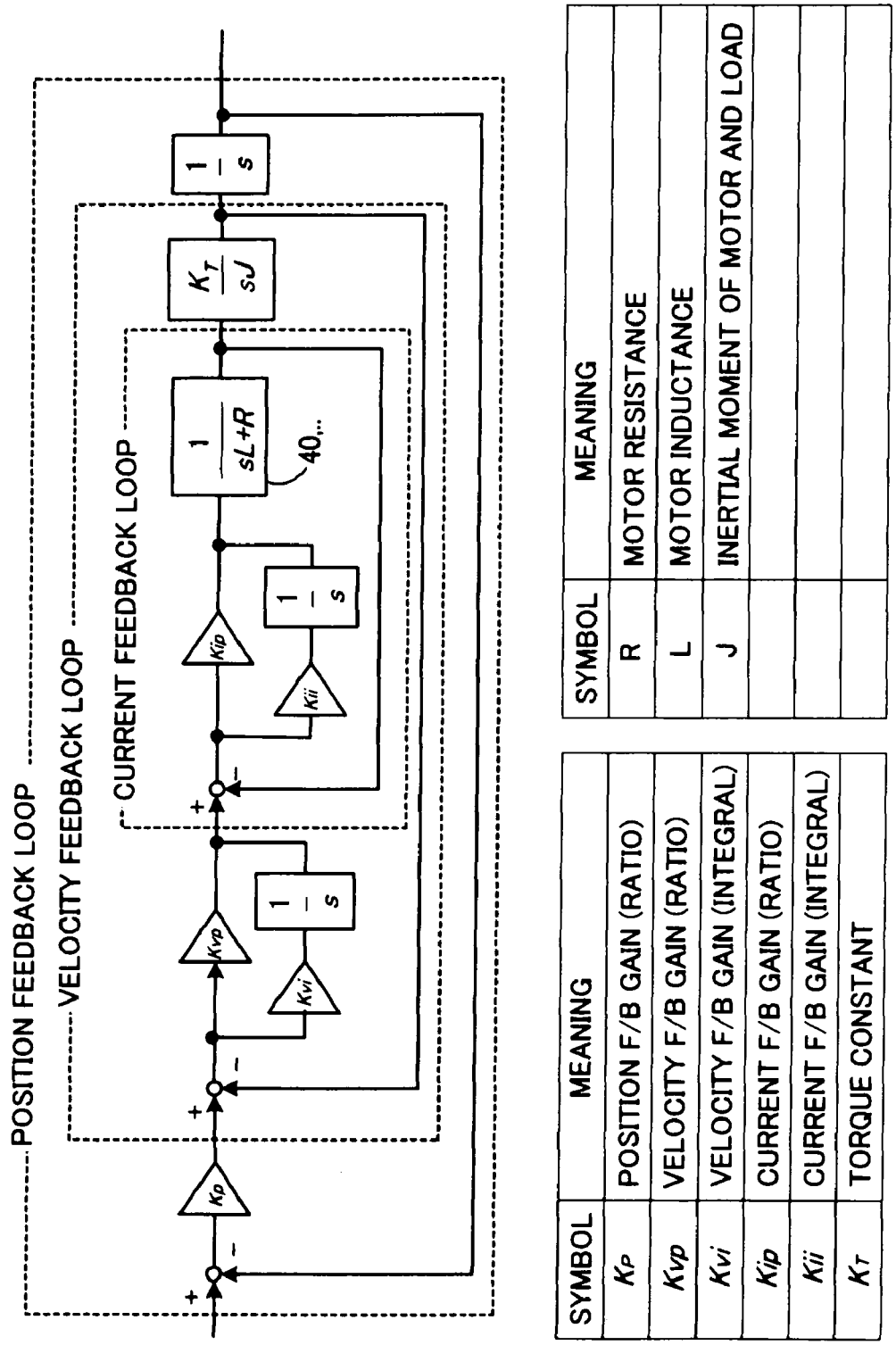

Next, the explanation will be made on the control of the motor drivers 92 at a time when the drive voltage is changed. The motor drivers 92 achieve the rotational speed required for the motors, by changing the setting of the current feedback gain in response to high/low motion mode. FIG. 6 shows a feedback loop of the motor control.

The DC brushless motor such as the 1Z motor 40 is generally feedback-controlled with respect to the position, velocity and current. A current feedback gain Ki, i.e., a proportional gain Kip and an integral gain Kii express the magnitude of a feedback amount of a loop that controls current flowing to the motor in the position feedback loop and velocity feedback loop.

Energy of the motor can be expressed by the product of torque and rotational speed, in which the torque is proportional to the current and rotational speed to the voltage. Since the voltage is inversely proportional to the current when the energy is same, the current is made to be suppressed by an amount of increase of the voltage. Specifically, a desired motion can be realized if the current or the voltage is changed, by reflecting the change of the drive voltage to the current feedback gain as shown in the formula.

$$Ki=C/V$$

In the above, Ki: current feedback gain, V: drive voltage, C: constant.

Thus, in order to maintain the operation characteristics of the motor against the voltage fluctuation, the adjustment of current feedback gain is the most simple and rational approach. It should be noted that the feedback gain has to be a current gain and the position or velocity gain cannot be used to achieve the foregoing effect.

Figure 7:
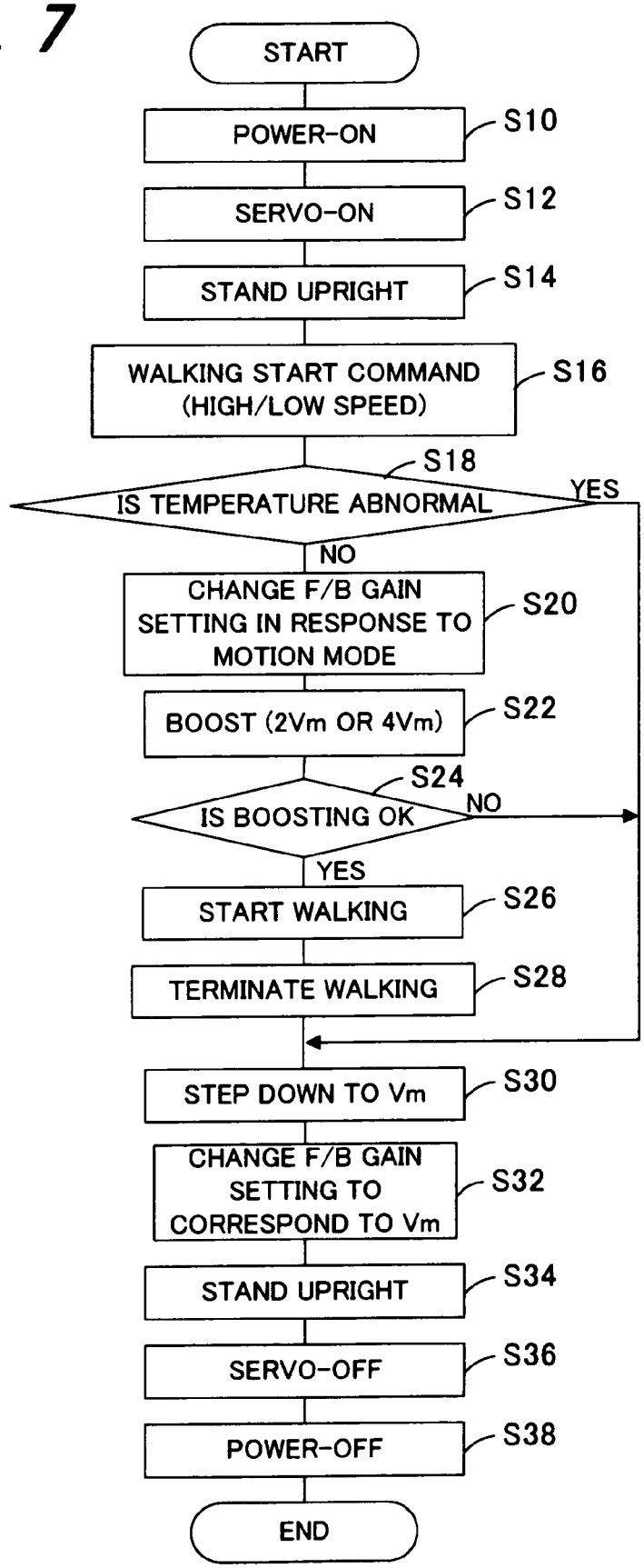
FIG. 7 is a flowchart showing the operation of the driving system for the mobile robot according to the first embodiment of this invention.

FIG. 7 is a flowchart showing the operation of the driving system for the mobile robot according to this embodiment. The illustrated program is executed by the central controller 24.

Figures 8, 9:
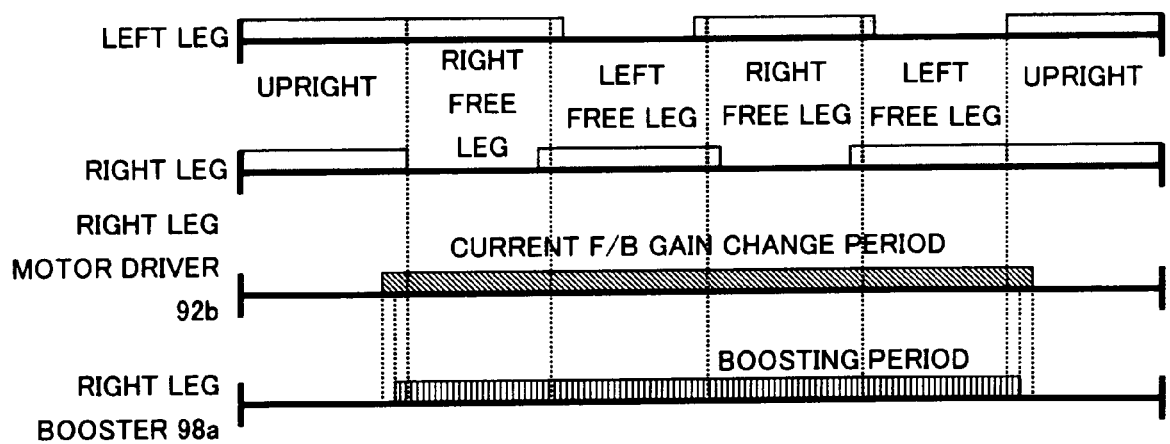
FIG. 8 is an explanatory view showing the characteristics of the drive voltage and current feedback gain set through the processing shown in FIG. 7.
FIG. 9 is a time chart showing the processing shown in FIG. 7.

FIG. 8 is an explanatory view showing the characteristics of the drive voltage and the like set through the processing of FIG. 7. The values shown in FIG. 8 are for the 2Y motor 46, but are applicable to the 1Y motor 42. As shown in FIG. 8, in the processing of FIG. 7, the drive voltage remains at the predetermined level Vm other than walking and, after starting walking, is boosted to twice (2 Vm) or four times (4 Vm) in response to the walking speed.

The current feedback gain is set to correspond to the drive voltage. Specifically, assuming that the proportional gain Kip and integral gain Kii at the maximum drive voltage as a and b, respectively, the gain is set to increase twice (2a, 2b) or four times (4a, 4b) with decreasing drive voltage.

It should be noted that the robot 10 in this embodiment can stand upright, but cannot walk when the 1Y motor 42 and 2Y motor 46 are driven at the predetermined level voltage Vm, can walk at low speed but cannot walk at high speed when they are driven at the voltage 2 Vm, and can walk at high speed when they are driven at the voltage 4 Vm. In FIG. 7, only the processing of the 1Y motor 42 and 2Y motor 46 is shown, but that of the other motors are similarly to the processing shown in FIG. 7, except for the fact that the other motors are not boosted.

The explanation will be made. In S10, power-on is executed. Describing this with reference to FIG. 4, the central controller 24 sends to the power controller 26 a command to supply the voltage Vm of the predetermined level from the battery 28 to the motor driver 92b. Upon being supplied with the voltage Vm from the power controller 26 as commanded, the motor driver 92b sends a signal indicative of completion of the power-on to the central controller 24.

The program proceeds to S12, in which servo-on (completion of operation of activating the servo mechanism) is executed. Specifically, the central controller 24 sends to the motor driver 92b a command to make the 1Y motor 42 and the like rotate to the origin position (of the control) and then stop there. The motor driver 92b executes the operation in response to the command and upon termination of the operation, sends a signal indicative of completion of the servo-on to the central controller 24.

Next, in S14, the robot 10 is controlled to stand upright. Specifically, after the servo-on is completed, the robot 10 is brought down from a lifter (not shown), and is controlled to maintain the upright posture based on the outputs of the six-axis force sensor 76 and inclinometer 80.

The program proceeds to S16, in which a walking start command (comprising motion mode signals of high/low speed walking) is outputted to the motor drivers 92a, 92b, 92c. Precisely, the central controller 24 sends the motion mode signal to the motor driver 92b to realize the high-speed rotation of the motors such as the 1Y motor, by increasing the drive voltage before start of the high speed walking, while decreasing the current feedback gain of the motor drivers 92.

Next, in S18, it is determined whether a temperature abnormality occurs, i.e., temperature of the boosters 98 or motor drivers 92 detected by the temperature sensors 102 exceeds a predetermined value. When the result is No, the program proceeds to S20, in which the setting of the current feedback gain is changed in the motor drivers 92 in response to the motion mode of walking start command outputted in S16, and to S22, in which the boosters 98 are turned on to boost the voltage to 2 Vm or 4 Vm in response to the motion mode. The drive voltage is kept at the predetermined voltage Vm until this time point.

In S24, it is determined whether the operation of the boosters 98 is conducted normally. This processing is done by monitoring the output voltage of the boosters 98 by A/D converters (not shown) of the motor drivers 92b, 92c and by determining whether they are stepped up to a voltage within a predetermined range.

When the result in S24 is Yes, the program proceeds to S26, in which the walking of the robot 10 is started and is continued until it is determined in S28 that the walking should be terminated. Then, in S30, the voltage supplied to the motors is stepped down to the steady-state level Vm, in S32, the setting of the current feedback gain is changed to that corresponds to the voltage Vm. Next in S34, the robot is again controlled to stand upright, and in S36, servo-off is executed, i.e., the motors are stopped, and in S38, power-off is executed, i.e., the voltage supply from the battery 28 is terminated.

When the result in S18 is Yes or the result in S24 is No, specifically when a temperature abnormality occurs or the voltage is not boosted to a value within the predetermined range, the boosting operation is not executed or, if it is in progress, is discontinued.

FIG. 9 is a time chart showing the processing shown in FIG. 7.

As shown, the setting value of the current feedback gain is changed during upright-standing immediately before starting the walking, the voltage is stepped up by the boosters 98, is stepped down in reverse process immediately after termination of the walking, and the setting value of the current feedback gain is changed. Specifically, the setting value of the current feedback gain is changed before stepping up the voltage of the boosters 98, and is changed after stepping down the voltage thereof. In the drawing, although control periods of the boosters and motor drivers for the left leg are not illustrated, the operation is conducted similarly to the right leg. Thus, it is configured to decrease the current feedback gain prior to boosting the voltage and, on the other hand, increase it following the step-down of the voltage. This is because the motors may oscillate, if this order is made inverse.

It may happen a case where the current feedback gain is decreased before completing the voltage boosting and if so, the motor torque may short. However, since the gain is changed during the upright-standing, this will influence little if the motor torque shortage is slight. This will be the same in the second embodiment in which the gain change is made during the free-leg period. At any rate, the deviation in changing time should preferably be small.

As described in the foregoing, in the first embodiment, it is configured to have a system for driving the mobile robot 10 having at least a plurality of (two) links (thigh ling 30, shank link 32) each connected by the joint, i.e., one of the hip joint, knee joint and ankle joint, the electric motors (1Y motor 42, 2Y motor 46, 3Y motor 48, 3X motor 50, etc) installed at the joint, the power source (battery) 28 installed at a position other than the links, the power lines 90 connecting the power source to the motors, the motor driver 92b, 92c that supplies drive voltage supplied through the power lines from the power source to the motors to drive the motors, in which the booster 98a that boosts the drive voltage to be supplied to the 1Y, 2Y motors 42, 46 is provided, and the booster 98a and the motor driver 92b are installed at the thigh link 30 of the links where the motor 42, 46 is installed, and the booster 98b that boosts the drive voltage to be supplied to the 3Y, 3X motors 48, 50 is provided, and the booster 98b and the motor driver 92c are installed at the shank link 32 of the links where the motor 48, 50 is installed.

More specifically, it is configured to have a system for driving the mobile robot 10 having at least the body 14, a plurality of (two) legs 12 each comprising the thigh link 30 connected to the body by the hip joint and the shank link 32 connected to the thigh link by the knee joint, a first electric motor (1Y motor 42) for driving the thigh link 30 in a forwarding direction in which the robot 10 forwards, a second electric motor (2Y motor 46) for driving the shank link 32 in the forwarding direction, the power source (battery) 28 installed at a position other than the thigh link 30 and shank link 32, the power lines 90 connecting the power source to the first and second motors, the motor driver 92b that supplies drive voltage supplied through the power lines from the power source to the first and second motors to drive the motors, in which the booster 98a that boosts the drive voltage to be supplied to the first and second motors is provided, and the booster 98a and the motor driver being installed in the thigh link 32 where the first and second motors are installed.

With this, it becomes possible to satisfy both the low-voltage demand for safety and the high-voltage demand for high-speed movement, thereby enabling to supply drive voltage effectively. In other words, installing of the boosters 98a, 98b and the associated motor drivers 92b, 92c at the same link makes possible to suppress the voltage of the power lines 90 and, when the power lines 90 connecting the battery 28 and the motors such as the 1Y motor 42 are arranged across the joints and an electric leakage occurs due to the power line break in the joint, it does not cause a problem. On the other hand, when the high voltage is required, the voltage is boosted by the booster 98a, 98b and then supplied for high-speed movement, thereby enabling to supply a voltage more effectively.

Further, it is configured such that the boosters 98a, 98b are installed with the motors requiring the high voltage, i.e., the 1Y motor 42, 2Y motor 46, 3Y motor 48 and the like that drive the thigh link 30 etc. in the forwarding direction and the associated components are installed at the same link, thereby enabling to supply a voltage more effectively.

Further, since the 1Y motor 42, etc., are supplied with the drive voltage through the boosters 98, the drive voltage can be maintained at constant even when voltage of the battery 28 fluctuates, resulting in the stable motor operation.

Also, since the drive voltage and operating voltage are made the same value (Vm), a step-down transformer in the power controller used in the prior art shown in FIG. 17 can be removed and the power controller 26 and motor driver 92 can be connected by a single cable, i.e., one power line 90, thereby achieving lightweight and low cost.

Since the voltage is set to be low, an amount of current will necessarily be increased and the cable 90 will be thicker. However, the above-mentioned configuration is still advantageous.

Further, the embodiment has a booster controller (S16 to S22) that controls the boosting operation of the booster 98 based on the motion of the robot 10, more precisely, the embodiment is configured to send the walking start command (motion mode signal) to boost the drive voltage before starting high speed walking, while decreasing the current feedback gain through the motor drivers 92 so as to respond to the high-speed rotation of the motors. With this, in addition to the foregoing effects, it becomes possible to supply the required voltage neither too much nor too little, thereby enabling to supply a voltage still more effectively.

Further, the booster controller monitors the output voltage of the booster 98 and, when the monitored voltage is not boosted to a predetermined voltage, discontinues controlling of the boosting operation (S24, S30). With this, in addition to the foregoing effects, it becomes possible to detect a fail only by monitoring the outputs from the boosters 98 and a necessary measure such as stopping the robot 10 can be taken.

Further, it is configured to have the temperature sensor 102 installed at least one of the booster 98 and the motor driver 92 and the booster controller discontinues controlling the boosting operation when the temperature detected by the temperature sensor is equal to or greater than a predetermined temperature (S18, S30). With this, in addition to the foregoing effects, it becomes possible to detect a fail from the temperature and a necessary measure such as stopping the robot 10 can be taken.

Further, it is configured to have a feedback controller (central controller 24, motor driver 92) that controls the drive current to a desired value and change the gain of the feedback control in response to the boosting operation of the booster controller (S20). With this, in addition to the foregoing effects, the 2Y motor or the other motors can be reliably operated at a necessary speed.

Figure 10:
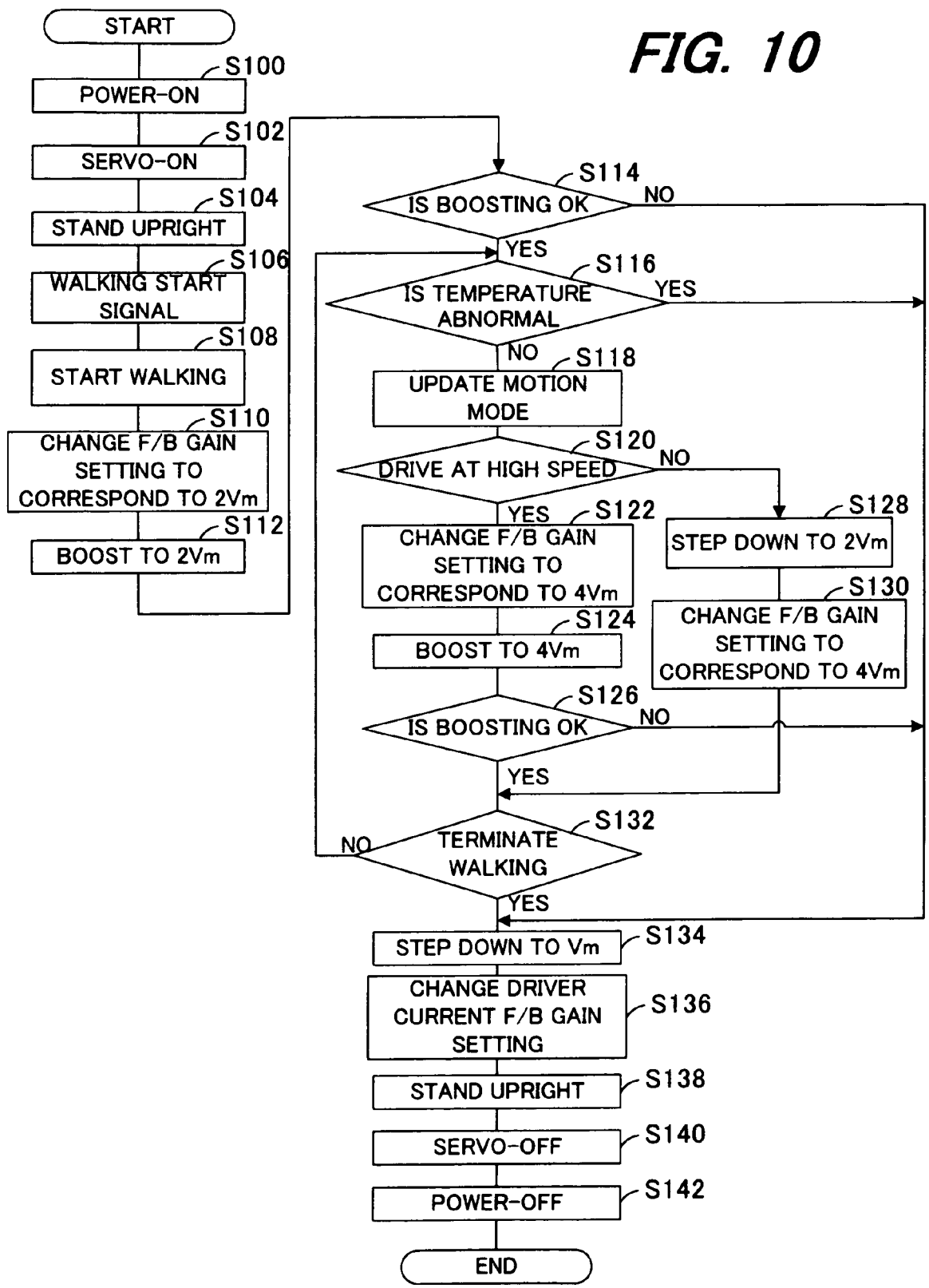
FIG. 10 is a flowchart similar to FIG. 7, but showing the operation of a driving system for a mobile robot according to a second embodiment of this invention.

FIG. 10 is a flowchart similar to FIG. 7, but showing the operation of a driving system for a mobile robot according to a second embodiment of this invention.

Figures 11, 12:
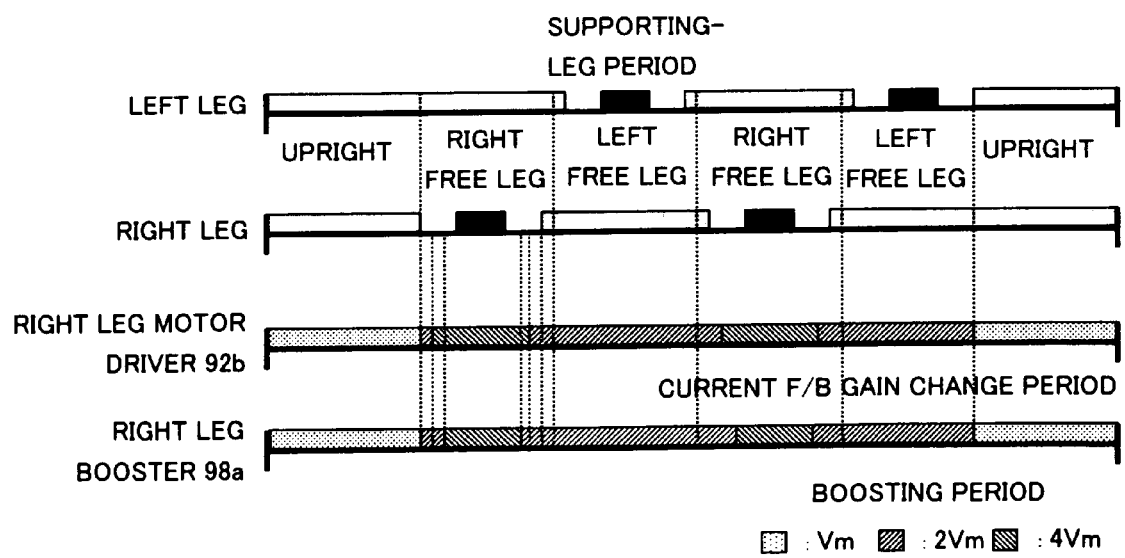
FIG. 11 is an explanatory view showing the characteristics of the voltage and current feedback gain set through the processing shown in FIG. 10.
FIG. 12 is a time chart showing the processing shown in FIG. 10.

FIG. 11 is an explanatory view similar to FIG. 8, but showing the characteristics of the drive voltage and the like set through the processing shown in FIG. 10. As shown in FIG. 11, in the second embodiment, it is configured such that the drive voltage differs between times other than walking and the walking, and is 2 Vm during the low speed walking and a supporting leg period of the high-speed walking, whereas is 4 Vm during the free-leg period of the high-speed walking which requires the high rotational speed of the motors. Change of the setting value of the current feedback gain is conducted in the same manner as in the first embodiment.

Also similarly to the first embodiment, the values shown in FIG. 11 for the 2Y motor 46 are applicable to the 1Y motor 42. Moreover, merely the processing with respect to the 1Y motor 42 and 2Y motor 46 is shown, but the other motors are also controlled through the processing similar to that in the first embodiment.

The explanation will be made. In S100 to S104, the same processing as in the first embodiment are conducted, in S106, the walking start signal is outputted to the motor drivers 92 immediately before starting the walking, and then in S108, the walking is started.

In S110, the setting value of the current feedback gain is changed in the motor driver 92b in response to the walking start signal in order to boost the voltage to 2 Vm that is a set voltage for upright start. In S112, the booster 98a is turned on and the voltage is boosted to 2 Vm. In S114, it is determined whether the voltage has been boosted, and when the result is Yes, the program proceeds to S116, in which it is determined whether a temperature abnormality occurs.

When the result in S116 is No, the program proceeds to S118, in which the motion mode is updated, i.e., the motion modes shown in FIG. 11 are successively outputted to the motor drivers 92b, 92c and to S120, in which, based on the characteristics shown in FIG. 11, it is determined in the motor driver 92b whether the high-speed driving is required. When the result in S120 is Yes, the program proceeds to S122, in which, based on the characteristics shown in FIG. 11, the setting of the current feedback gain is changed to values for the high-speed driving through the motor drivers 92b, 92c, and to S124, the outputs of the boosters 98 are boosted to 4 Vm. Next, in S126, it is again determined whether the voltage has been boosted.

On the other hand, when the result in S120 is No, it means that the low-speed driving suffices, in the next step of S128, based on the characteristics shown in FIG. 11, the voltage is stepped down to 2 Vm through the motor driver 92b and then in S130, the setting of the current feedback gain is changed to values corresponding to 2 Vm.

In S132, it is determined whether the walking is terminated. As long as the result in S132 is No, the above-mentioned processing is repeated. When the result in S132 is Yes, the program proceeds to S134, in which the voltage is stepped down to the steady-state voltage Vm, to S136, in which the setting of the current feedback gain is changed to the value corresponding to Vm, and is terminated after the processing of S138 to S142 similarly to the first embodiment. When the result in S114 is No, the result in S116 is Yes, or the result in S126 is No, the program proceeds to S134.

FIG. 12 is a time chart showing the processing shown in FIG. 10.

A leg stepping first when the robot 10 is started to walk from the upright condition is the free leg and the other leg is the supporting leg. When the right leg which is the free leg makes a big step in the case of high-speed walking, the high-speed rotation is required. This period is indicated by painted areas with black.

Ordinarily, the high-speed rotation is required during the free-leg period. In other words, it suffices if the voltage is high only at the moment of high-speed rotation during the free-leg period. In the second embodiment, therefore, it is configured such that boosting to 4 Vm or step-down from 4 Vm is conducted during the free-leg period and the voltage becomes high only at the moment.

As mentioned in the foregoing, the driving system for the mobile robot according to the second embodiment is also configured to control the boosting operation of the boosters 98 by retrieving table values set beforehand in accordance with the motion of the robot 10, i.e., the characteristics shown in FIG. 11, so as to realize the high-speed driving during the free-leg period. With this, in addition to the foregoing effects, it becomes possible to supply the required voltage neither too much nor too little, thereby enabling to supply a voltage still more effectively.

Further, since the stepping up to 4 Vm or stepping-down from 4 Vm is conducted during the free-leg period where the robot 10 is less likely to fall, if the 1Y motor 42 or other motor should oscillate due to deviation between the driving voltage and the setting of the current feedback gain, the falling possibility can be reduced.

The remaining configuration as well as the effects is the same as that in the first embodiment.

Figure 13:
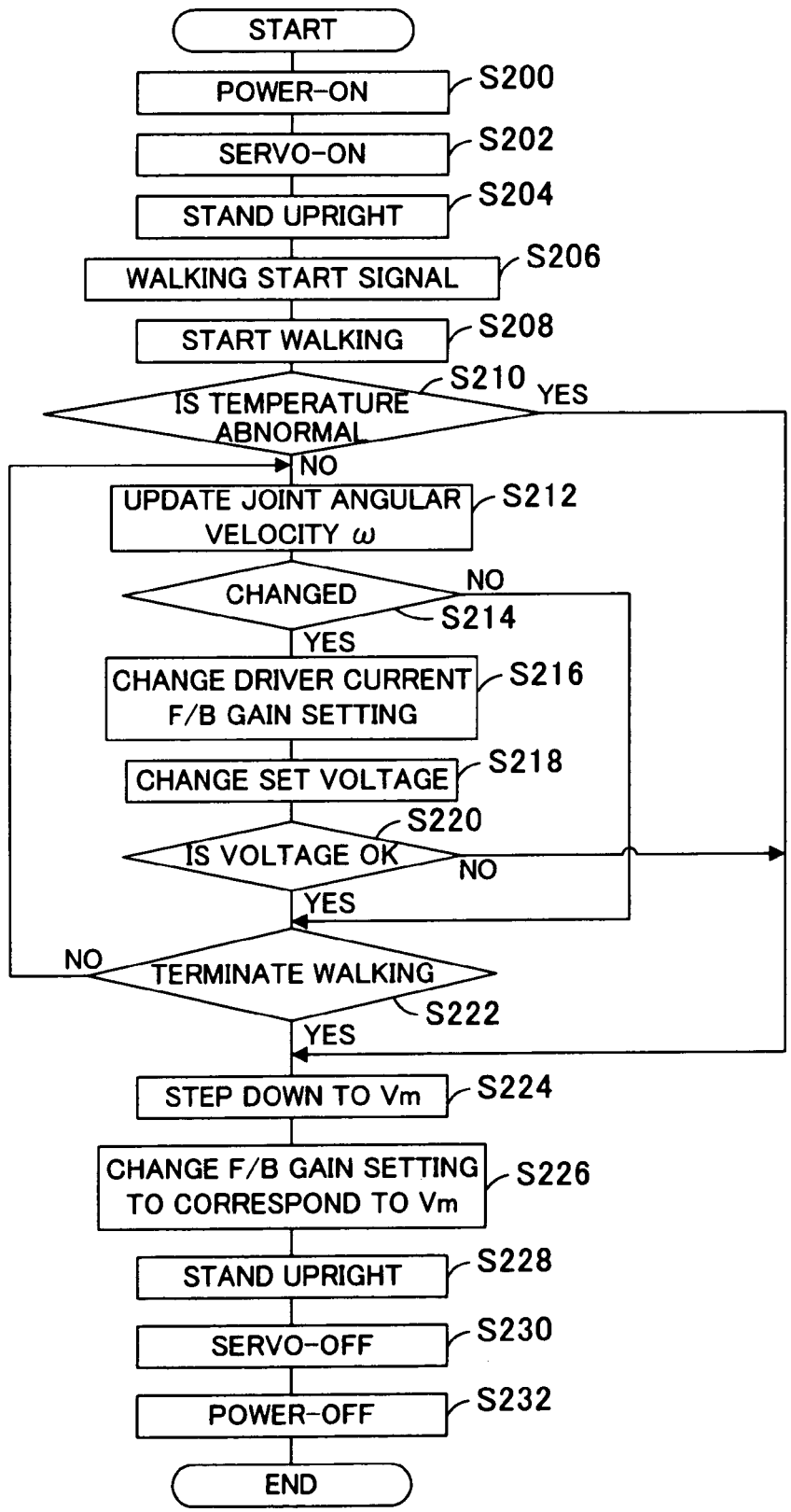
FIG. 13 is a flowchart similar to FIG. 7, but showing the operation of a driving system for a mobile robot according to a third embodiment of this invention.

FIG. 13 is a flowchart similar to FIG. 7, but showing the operation of a driving system for a mobile robot according to a third embodiment of this invention. The shown program is also executed by the central controller 24.

Figures 14, 15:
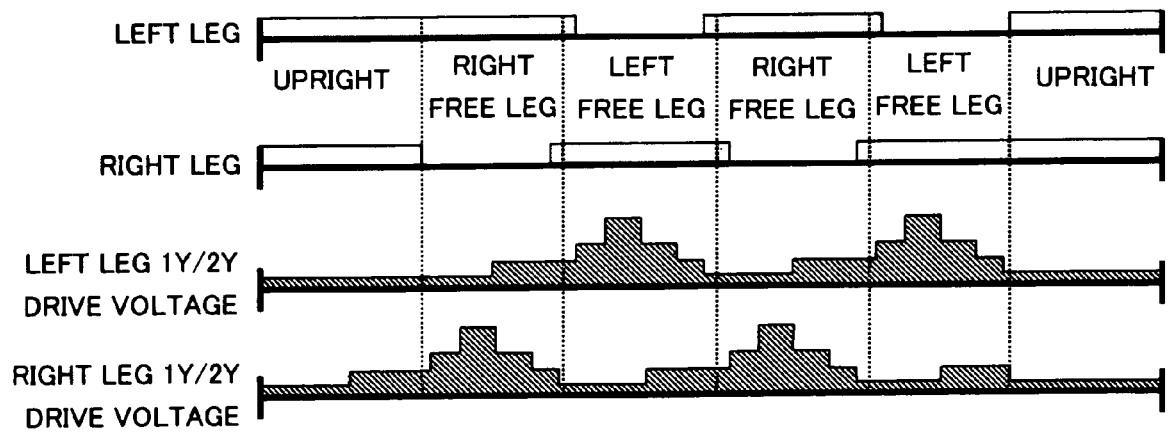
FIG. 14 is an explanatory view showing the characteristics of the voltage and current feedback gain set through the processing shown in FIG. 13.
FIG. 15 is a time chart showing the processing shown in FIG. 13.

FIG. 14 is an explanatory view similar to FIGS. 8 and 11, but showing the characteristics of the voltage change with respect to the 2Y motor 46.

In the third embodiment, as shown in FIG. 14, based on a required joint angular velocity, i.e., a knee joint angular velocity $\omega$ [rad/second] estimated from the motion of the robot 10, the voltage levels and setting value of the current feedback gain corresponding thereto are prepared as table values beforehand, thereby enabling a finer control.

The explanation will be made with focus on points of difference from the first and second embodiments.

After conducting the processing of S200 to S210 similarly to the first and second embodiments, the program proceeds to S212, in which the joint angular velocity $\omega$ is updated. Specifically, after starting walking, the central controller 24 successively outputs the knee joint angular velocity $\omega$ within a range of $\omega 1$ to $\omega 4$ to the motor driver 92b in accordance with the characteristics shown in FIG. 14. The values shown in FIG. 14 are for the 2Y motor 46, but are applicable to the 1Y motor 42.

When, in S214, it is discriminated that the joint angular velocity $\omega$ is changed, the program proceeds to S216, in which the setting of the current feedback gain is changed through the motor driver 92b, to S218, in which the set voltage, i.e., an output voltage of the booster 98a is changed, and to S220, in which it is determined whether the voltage has been changed. The foregoing processing is repeated until it is discriminated that the walking is terminated in S222.

The remaining processing is the same as that in the first and second embodiments. The processing with respect to the 1Y motor 42 and 2Y motor 46 is shown, but the other motors are also controlled through the processing similar to that in the first and second embodiments.

FIG. 15 is a time chart showing the processing shown in FIG. 13.

As mentioned in the foregoing, the driving system for the mobile robot according to the third embodiment is also configured to control the boosting operation of the boosters 98a by retrieving table values set beforehand in accordance with the motion of the robot 10, i.e., by, based on the knee joint angular velocity estimated from a motion of the robot 10, retrieving the voltage levels and current feedback gain corresponding thereto as shown in FIG. 14. With this, in addition to the foregoing effects, it becomes possible to supply the required voltage neither too much nor too little, thereby enabling to supply a voltage still more effectively.

The remaining configuration as well as the effects is the same as that in the first embodiment.

Figure 16:
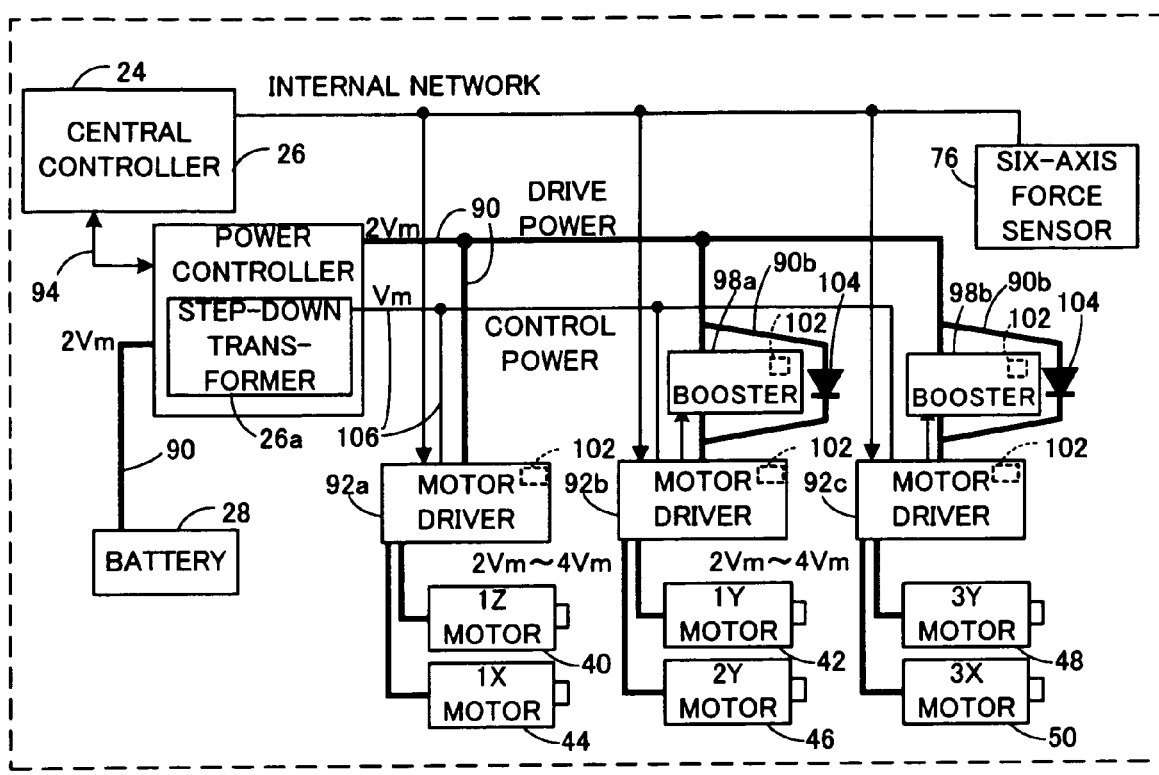
FIG. 16 is a block diagram similar to FIG. 4, but showing a driving system for a mobile robot according to a fourth embodiment of this invention.

FIG. 16 is a block diagram similar to FIG. 4, but showing a driving system for a mobile robot according to a fourth embodiment of this invention.

In the fourth embodiment, the boosters 98a, 98b are interposed in the power lines 90 and the power lines 90 are installed with a bypass 90b that bypasses the boosters 98a, 98b. The bypass 90b is provided with a backflow prevention diode 104.

An output voltage of the battery 28 is made 2 Vm and is stepped down to Vm by a step-down transformer 26a of the power controller 26. Specifically, it is configured to have second power lines 106 in addition to the power lines 90, and supply drive voltage 2 Vm through the power lines 90 and control voltage Vm stepped down through the second power lines 106.

Since the fourth embodiment is configured as in the foregoing, although it has a disadvantage of requiring the backflow prevention diode 104 at the bypass, it is still advantageous in that the electric power loss can be reduced compared to the case of interposing the boosters 98. It should be noted that an FET can be used in place of the diode 104.

As stated in the foregoing, the first to fourth embodiments are configured to have a system for driving a mobile robot (10) having at least a plurality of links (thigh link 30, shank link 32) each connected by a joint, an electric motor (1Y motor 42, 2Y motor 46, etc.) installed at the joint, a power source (battery 28) installed at a position other than the links, a power line (90) connecting the power source to the motor, and a motor driver (92) that supplies drive voltage supplied through the power line from the power source to the motor to drive the motor, comprising: a booster (98) that boosts the drive voltage to be supplied to the motor, the booster and the motor driver being installed at one of the links where the motor is installed.

Further, the first to fourth embodiments are configured to have a system for driving a mobile robot (10) having at least a body (14), a plurality of legs (12) each comprising a thigh link (30) connected to the body by a hip joint and a shank link (32) connected to the thigh link by a knee joint, a first electric motor (1Y motor 42) for driving the thigh link in a forwarding direction in which the robot forwards, a second electric motor (2Y motor 46) for driving the shank link in the forwarding direction, a power source (battery 28) installed at a position other than the thigh link and shank link, a power line (90) connecting the power source to the first motor and the second motor, and a motor driver (92b) that supplies drive voltage supplied through the power line from the power source to the first motor and the second motor to drive the motors, comprising: a booster (98a) that boosts the drive voltage to be supplied to the first motor and the second motor, the booster (98a) and the motor driver (92b) being installed in the thigh link (30) where the first motor and the second motor are installed.

In the system, the booster (98) is interposed in the power line (90) and the power line (90) is installed with a bypass (90b) that bypasses the booster (98).

The system further includes: a booster controller (24, S16 to S22, S106 to S130, S206 to S218) that controls boosting operation of the booster (98) based on motion of the robot (10).

In the system, the booster controller controls the boosting operation of the booster (98) by retrieving table values set in accordance with the motion of the robot (24, S16 to S22, S106 to S130, S206 to S218).

In the system, the booster controller monitors output voltage of the booster (98) and discontinues controlling of the boosting operation when the monitored voltage is not boosted to a predetermined voltage (24, S24, S30, S114, S134, S220, S224).

The system further includes: a temperature sensor (102) installed to at least one of the booster (98) and the motor driver (92), and the booster controller discontinues controlling of the boosting operation when the detected temperature is greater or equal to a predetermined temperature (24, S18, S30, S116, S134, S210, S224).

The system further includes: a feedback controller (24, S20, S122, S130, S216, S226) that controls a drive current to a desired value, and the feedback controller changes a gain (current feedback gain) of the feedback control in response to the boosting operation of the booster controller.

It should be noted that, in the foregoing, although the explanation is made only on the legs 12, the arms 20 are similarly configured such that a booster is provided for a motor driver positioned across a joint and they are installed at a same link.

It should further be noted that, although it is configured so that one motor driver 92 controls two motors, the number of the motors is not limited thereto but determined from factors such as the processing capacity of the CPU, weight or size of the motor driver 92, or complexity of wiring. For instance, when a very light and small motor driver 92 is utilized, one motor may be controlled by one motor driver. When the processing capacity of the CPU is sufficiently high, one motor driver can control four motors.

It should further be noted that, although the boosters 98 are provided for both the motor driver 92b controlling the 1Y motor 42 and 2Y motor 46 and the motor driver 92c controlling the 3Y motor 48 and 3X motor 50, the booster 98 can be provided only for the motor driver 92b controlling the 1Y motor 42 and 2Y motor 46.

It should further be noted that, although the current feedback gain is calculated from the drive voltage, since the rotational speed of the motor is proportional to the drive voltage, it can be calculated from the motor rotational speed using the following formula.

$$Ki=C/N \text{ (N: motor rotational speed, C: constant)}$$

It should further be noted that the number of motion modes in FIGS. 8, 11 and 14 are made three or four, but it is not limited thereto. It is presumable that several patterns should be realistic.

It should further be noted that the drive voltage is changed in response to the output of the central controller 24, but it can be conducted by discriminating foot landing or foot lifting based on an output of the six-axis force sensor 76.

It should further be noted that, although the mobile robot, particularly a legged mobile robot is taken as an example of a mobile object, this invention is not limited thereto but applicable to any type of mobile robot if it is equipped with a plurality of links connected by a joint and supplies a voltage provided from a power source installed at a position other than the joint to an electric motor installed at the joint.

Japanese Patent Application No. 2007-160037 filed on Jun. 18, 2007, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for driving a mobile robot having at least a plurality of links each connected by a joint, an electric motor installed at the joint, a power source installed at a position other than the links, a power line connecting the power source to the motor, and a motor driver that supplies drive voltage supplied through the power line from the power source to the motor to drive the motor, comprising:
   a booster that boosts the drive voltage to be supplied to the motor, the booster and the motor driver being installed at one of the links where the motor is installed; and
   a booster controller that controls boosting operation of the booster based on motion of the robot.

2. The system according to claim 1, wherein the booster is interposed in the power line and the power line is installed with a bypass that bypasses the booster.

3. The system according to claim 1, wherein the booster controller controls the boosting operation of the booster by retrieving table values set in accordance with the motion of the robot.

4. The system according to claim 1, wherein the booster controller monitors output voltage of the booster and discontinues controlling of the boosting operation when the monitored voltage is not boosted to a predetermined voltage.

5. The system according to claim 1, further including:
a temperature sensor installed to at least one of the booster and the motor driver,
and the booster controller discontinues controlling of the boosting operation when the detected temperature is greater or equal to a predetermined temperature.

6. The system according to claim 1, further including:
a feedback controller that controls a drive current to a desired value,
and the feedback controller changes a gain of the feedback control in response to the boosting operation of the booster controller.

7. A system for driving a mobile robot having at least a body, a plurality of legs each comprising a thigh link connected to the body by a hip joint and a shank link connected to the thigh link by a knee joint, a first electric motor for driving the thigh link in a forwarding direction in which the robot forwards, a second electric motor for driving the shank link in the forwarding direction, a power source installed at a position other than the thigh link and shank link, a power line connecting the power source to the first motor and the second motor, and a motor driver that supplies drive voltage supplied through the power line from the power source to the first motor and the second motor to drive the motors, comprising:
a booster that boosts the drive voltage to be supplied to the first motor and the second motor, the booster and the motor driver being installed in the thigh link where the first motor and the second motor are installed; and
a booster controller that controls boosting operation of the booster based on motion of the robot.

8. The system according to claim 7, wherein the booster is interposed in the power line and the power line is installed with a bypass that bypasses the booster.

9. The system according to claim 7, wherein the booster controller controls the boosting operation of the booster by retrieving table values set in accordance with the motion of the robot.

* * * * *